(12) United States Patent
Takegawa

(10) Patent No.: US 9,041,853 B2
(45) Date of Patent: May 26, 2015

(54) MOBILE TERMINAL, METHOD OF IMAGE PROCESSING, AND PROGRAM

(75) Inventor: Tatsuya Takegawa, Kawasaki (JP)

(73) Assignee: NEC Casio Mobile Communications, Ltd., Kawasaki-shi, Kanagawa (JP)

( * ) Notice: Subject to any disclaimer, the term of this patent is extended or adjusted under 35 U.S.C. 154(b) by 28 days.

(21) Appl. No.: 13/884,918

(22) PCT Filed: Nov. 24, 2011

(86) PCT No.: PCT/JP2011/077018
§ 371 (c)(1),
(2), (4) Date: May 10, 2013

(87) PCT Pub. No.: WO2012/073779
PCT Pub. Date: Jun. 7, 2012

(65) Prior Publication Data
US 2013/0229547 A1 Sep. 5, 2013

(30) Foreign Application Priority Data

Dec. 1, 2010 (JP) ................................. 2010-268240

(51) Int. Cl.
*H04N 5/225* (2006.01)
*H04N 5/232* (2006.01)
*G02B 13/00* (2006.01)
(Continued)

(52) U.S. Cl.
CPC ........... *H04N 5/225* (2013.01); *H04N 5/23296* (2013.01); *H04N 5/23293* (2013.01); *G02B 13/009* (2013.01); *G03B 13/36* (2013.01); *H04N 5/2628* (2013.01); *H04N 5/23212* (2013.01)

(58) Field of Classification Search
CPC .... G02B 13/009; G02B 21/367; G03B 13/36; H04N 5/225; H04N 5/23212; H04N 5/2628; H04N 2/23293; H04N 5/2356; H04N 5/23296
See application file for complete search history.

(56) References Cited

U.S. PATENT DOCUMENTS 5,739,857 A * 4/1998 Kaneda .......................... 348/349
6,344,933 B1 * 2/2002 Yajima .......................... 359/697
6,370,332 B1 * 4/2002 Kubo .............................. 396/77
(Continued)

FOREIGN PATENT DOCUMENTS

EP   1 818 717 A2   8/2007
JP   10-282396 A    10/1998
(Continued)

OTHER PUBLICATIONS

European Search Report dated Mar. 24, 2014.
(Continued)

*Primary Examiner* — Michael Osinski
(74) *Attorney, Agent, or Firm* — McGinn IP Law Group, PLLC

(57) ABSTRACT

A mobile terminal includes a camera unit that captures a subject while moving a lens back and forth in an optical axis direction and outputs a plurality of images with different angles of view, a storage unit that stores the plurality of images output from the camera unit, an angle-of-view correction unit that takes any one image of the plurality of images stored in the storage unit and corrects the other images of the plurality of images so that the angles of view of the other images match the angle of view of the one image, and a display that outputs the one image and the other images corrected by the angle-of-view correction unit.

8 Claims, 3 Drawing Sheets

(51) Int. Cl.
*G03B 13/36* (2006.01)
*H04N 5/262* (2006.01)

(56) References Cited

U.S. PATENT DOCUMENTS

| | | | |
|---|---|---|---|
| 7,652,714 B2* | 1/2010 | Gotanda | 348/345 |
| 7,899,316 B2* | 3/2011 | Moriya | 396/78 |
| 7,999,874 B2* | 8/2011 | Iwasaki | 348/345 |
| 8,493,493 B2* | 7/2013 | Mise et al. | 348/333.02 |
| 8,526,805 B2* | 9/2013 | Nagata | 396/77 |
| 2001/0026324 A1* | 10/2001 | Saito et al. | 348/345 |
| 2001/0035910 A1* | 11/2001 | Yukawa et al. | 348/349 |
| 2002/0191100 A1* | 12/2002 | Matsunaga et al. | 348/345 |
| 2004/0041919 A1* | 3/2004 | Yamanaka | 348/222.1 |
| 2004/0239775 A1* | 12/2004 | Washisu | 348/239 |
| 2005/0061952 A1* | 3/2005 | Kawahara | 250/208.1 |
| 2005/0185948 A1* | 8/2005 | Saito et al. | 396/133 |
| 2006/0126081 A1 | 6/2006 | Watanabe et al. | |
| 2006/0210260 A1* | 9/2006 | Yata | 396/147 |
| 2007/0064141 A1* | 3/2007 | Misawa et al. | 348/333.01 |
| 2007/0116382 A1* | 5/2007 | Gotanda | 382/293 |
| 2007/0230945 A1* | 10/2007 | Shiohara | 396/374 |
| 2007/0296837 A1* | 12/2007 | Morita | 348/240.99 |
| 2008/0080848 A1* | 4/2008 | Tsai | 396/127 |
| 2008/0143865 A1* | 6/2008 | Kimoto | 348/345 |
| 2008/0240698 A1* | 10/2008 | Bartilson et al. | 396/78 |
| 2008/0259172 A1* | 10/2008 | Tamaru | 348/218.1 |
| 2009/0009651 A1* | 1/2009 | Takayanagi | 348/345 |
| 2009/0073304 A1* | 3/2009 | Kumagai et al. | 348/345 |
| 2009/0115856 A1* | 5/2009 | Washisu | 348/208.1 |
| 2009/0322935 A1* | 12/2009 | Yamasaki | 348/349 |
| 2010/0053365 A1* | 3/2010 | Abe et al. | 348/222.1 |
| 2010/0149383 A1* | 6/2010 | Maeda et al. | 348/240.3 |
| 2010/0149402 A1* | 6/2010 | Aoki et al. | 348/333.12 |
| 2010/0214444 A1 | 8/2010 | Teshima et al. | |
| 2010/0266160 A1* | 10/2010 | Yamada | 382/103 |
| 2010/0271537 A1* | 10/2010 | Endoh et al. | 348/349 |
| 2010/0315521 A1* | 12/2010 | Kunishige et al. | 348/220.1 |
| 2011/0134284 A1* | 6/2011 | Kuriyama | 348/240.3 |
| 2011/0157404 A1* | 6/2011 | Shiohara | 348/222.1 |
| 2011/0243451 A1* | 10/2011 | Oyaizu | 382/190 |
| 2011/0298961 A1* | 12/2011 | Yoshida | 348/333.01 |
| 2012/0106938 A1* | 5/2012 | Yonekawa | 396/125 |
| 2012/0155844 A1* | 6/2012 | Nagata | 396/77 |
| 2013/0100257 A1* | 4/2013 | Sawachi | 348/49 |

FOREIGN PATENT DOCUMENTS

| | | |
|---|---|---|
| JP | 11-023949 A | 1/1999 |
| JP | 2006-129211 A | 5/2006 |
| JP | 2008-042404 A | 2/2008 |
| JP | 2008-160622 A | 7/2008 |

OTHER PUBLICATIONS

International Search Report in PCT/JP2011/077018 dated Feb. 7, 2012(English Translation Thereof).

* cited by examiner

MOBILE TERMINAL, METHOD OF IMAGE PROCESSING, AND PROGRAM

TECHNICAL FIELD

The present invention relates to a camera-equipped mobile terminal, a method of image processing, and a program for causing the mobile terminal to implement the image processing.

BACKGROUND ART

Cameras are known that include a function called continuous autofocus (hereinafter denoted as AF-C), by which a subject as a distinct point is continuously kept in focus. Typically, a digital camera is provided with a display such as a liquid crystal panel. In performing AF-C with such a digital camera, a user can see images output on a display to confirm that the focus remains fixed on a subject even if the subject changes or moves.

The operation of AF-C may be roughly divided into two modes; a minute movement mode and an in-focus position search mode. In the minute movement mode, images are captured while a lens is minutely moved back and forth relative to the current position in an optical axis direction. In the in-focus position search mode, the lens is moved to an in-focus position if the analysis of the images captured by the minutely moved lens suggests an out-of-focus state.

In AF-C performed with a digital camera as described above, the camera minutely moves the lens in order to determine whether it is necessary to search for the in-focus position, even when substantially no changes occur in the position of a subject with respect to the direction of the optical axis of the lens. The minute movements then alter the optical path, causing variations in the angle of view of images output on the display. As a result, a subject that wobbles back and forth is displayed on the display screen, so that the subject appears to vary in size. This creates discomfort for the user who is viewing.

Examples of methods of correcting the variations in the angle of view due to the lens movements are disclosed in JP10-282396A (hereinafter referred to as patent document 1) and JP2008-160622A (hereinafter referred to as patent document 2). Patent document 1 discloses an apparatus for controlling the driving of lenses, including lenses and a position detector that detects the positions of the lenses. Each of the lenses may be independently controlled to eliminate variations in the angle of view. Patent document 2 discloses an imaging apparatus, including lenses and a position detector that detects the positions of the lenses. Each of the lenses may be independently controlled to restrain the variations in the angle of view of output images.

SUMMARY OF INVENTION

The apparatus for controlling the driving of lenses disclosed in patent document 1 is directed to TV broadcast cameras and therefore can be applied to cameras designed mainly for shooting images. In addition, the techniques disclosed in patent documents 1 and 2 require a configuration in which a controller independently controls each of the lenses and in which a position detector detects the position of each lens.

It is difficult to directly apply the techniques disclosed in the above patent documents to mobile-device-mounted cameras, which are required to be small. Some mobile-device-mounted cameras, such as recent cameras for mobile phones, are provided with multiple lenses. To achieve a small device size, however, such a camera must not include a mechanism for independently controlling each of the lenses, but the lenses must be able to move simultaneously.

In order to solve the problem of the techniques as described above, an exemplary object of the invention is to provide a mobile terminal, a method of image processing, and a program for causing the mobile terminal to implement the image processing, such that variations in the angle of view of displayed images are prevented while AF-C is being performed.

A mobile terminal according to an exemplary aspect of the invention includes a camera unit that captures a subject while moving a lens back and forth in an optical axis direction and outputs a plurality of images with different angles of view, a storage unit that stores the plurality of images output from the camera unit, an angle-of-view correction unit that takes any one image of the plurality of images stored in the storage unit and corrects the other images of the plurality of images so that the angles of view of the other images match the angle of view of the one image, and a display that outputs the one image and the other images corrected by the angle-of-view correction unit.

A method of image processing according to the present invention is a method of image processing for a controller in a mobile terminal which comprises a camera unit with a lens, a storage unit, a display, and the controller, and the method includes the controller causing the camera unit to capture a subject while moving the lens back and forth in an optical axis direction and to output a plurality of images with different angles of view, the controller storing the plurality of images output from the camera unit in the storage unit, the controller taking any one image of the plurality of images stored in the storage unit and correcting the other images of the plurality of images so that the angles of view of the other images match the angle of view of the one image, and the controller causing the display to output the one image and the other images corrected by an angle-of-view correction unit.

Further, a program according to the present invention is a program to be executed by a controller in a mobile terminal which comprises a camera unit with a lens, a storage unit, a display, and the controller, the program causing the controller to perform causing the camera unit to capture a subject while moving the lens back and forth in an optical axis direction and to output a plurality of images with different angles of view, storing the plurality of images output from the camera unit in the storage unit, taking any one image of the plurality of images stored in the storage unit and correcting the other images of the plurality of images so that the angles of view of the other images match the angle of view of the one image, and causing the display to output the one image and the other images corrected by an angle-of-view correction unit.

DETAILED DESCRIPTION OF THE EXEMPLARY EMBODIMENT

A configuration of a mobile terminal in an exemplary embodiment will be described. In the exemplary embodiment, detailed description of components of portions relevant to the present invention will be given, while detailed description of components relevant to mobile-terminal functions will be omitted.

Figure 1:
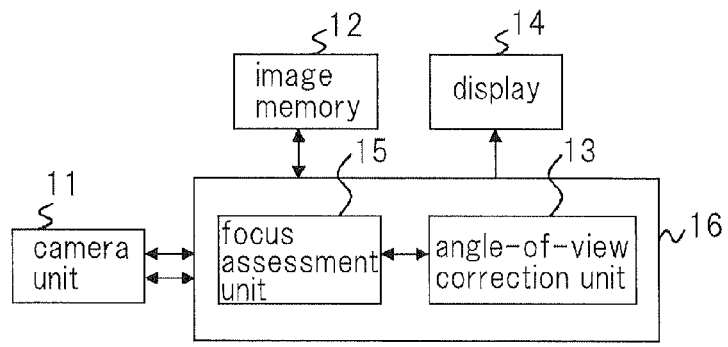
FIG. 1 is a block diagram showing an exemplary configuration of a mobile terminal in an exemplary embodiment.
Figure 2:
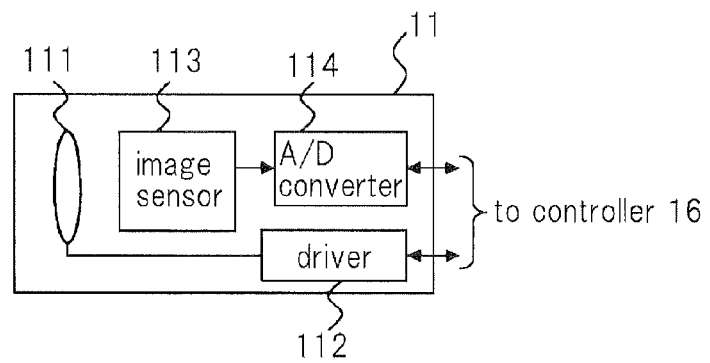
FIG. 2 is a block diagram showing an exemplary configuration of a camera unit shown in FIG. 1.

FIG. 1 is a block diagram showing an exemplary configuration of the mobile terminal in the exemplary embodiment. FIG. 2 is a block diagram showing an exemplary configuration of a camera unit shown in FIG. 1.

As shown in FIG. 1, the mobile terminal in the exemplary embodiment comprises camera unit 11, image memory 12 that stores images output from camera unit 11, display 14 that outputs images stored in image memory 12, and controller 16 that controls these components. Controller 16 comprises angle-of-view correction unit 13 that corrects the angles of view of images captured by camera unit 11 and focus assessment unit 15 that determines whether focus is achieved based on images captured by camera unit 11. Each component will be described in detail below.

Controller 16 is provided with a CPU (Central Processing Unit) (not shown) that performs processing according to a program, and memory (not shown) for storing the program. In the program, a threshold for determining whether focus is achieved is written in advance. The CPU executes the program to implement angle-of-view correction unit 13 and focus assessment unit 15 as virtual units in the mobile terminal.

As shown in FIG. 2, camera unit 11 comprises lens 111, driver 112 that moves lens 111 in the optical axis direction, image sensor 113 that converts images projected through lens 111 into electric signals, and A/D converter 114 that converts the analog electric signals output from image sensor 113 into digital signals. Although FIG. 2 shows one convex lens 111, one or more lenses 111 may be employed. In addition, the type of lens 111 is not limited to a convex type.

Image sensor 113 is, for example, a CCD (Charge Coupled Device) or CMOS (Complementary Metal Oxide Semiconductor) image sensor. A/D converter 114 converts image data received from image sensor 113 into digital signals and sends the digital signals to controller 16.

Image memory 12 may be volatile memory such as DRAM (Dynamic Random Access Memory) or SRAM (Static RAM), or nonvolatile memory such as flash memory. Image memory 12 stores data on images captured by camera unit 11, and data on images corrected by controller 16. Display 14 outputs images received from controller 16.

Upon input of an instruction to perform AF-C, focus assessment unit 15 in controller 16 causes camera unit 11 to execute a minute movement mode at regular time intervals. Specifically, focus assessment unit 15 sends control signals driver 112 instructing it to move lens 111 back and forth in the optical axis direction, and stores in image memory 12 pieces of image data received from A/D converter 114.

Focus assessment unit 15 also determines, for images of the pieces of image data stored in image memory 12, whether the amount of change in contrast exceeds the above-mentioned threshold. If the amount of change in contrast exceeds the threshold, focus assessment unit 15 determines that lens 111 is not at an in-focus position. If the amount of change in contrast does not exceed the threshold, focus assessment unit 15 determines that lens 111 is at the in-focus position. If focus assessment unit 15 determines that lens 111 is not at the in-focus position, focus assessment unit 15 determines, as a new in-focus position, the position of lens 111 at which the image contrast is the maximum based on the contrasts of the images, and executes an in-focus position search mode. Specifically, focus assessment unit 15 sends a control signal to driver 112 instructing it to move lens 111 to the determined in-focus position.

The portion of each image that is to be used for the comparison of the contrast is written in advance in the program. For example, the portion at which the contrast is to be compared may be a predetermined range around the center of each image, or may be an area containing a human face detected by instantaneous analysis of each image.

The value of the "contrast" to be compared may not be the value of the contrast itself detected for every pixel of image sensor 113 shown in FIG. 2. Rather, the value may be the sum of the differences between the contrast values of adjacent pixels in an area specified as an area to be compared. This is based on a characteristic in which the more an image is in focus, the greater are the differences between the contrast values of adjacent pixels.

While focus assessment unit 15 may instruct driver 112 to move lens 111 to the in-focus position through various approaches, two approaches will be described here.

The first one of the two approaches is as follows. A table is stored in advance in memory (not shown) in controller 16. The table represents the relationship between the number of pulses serving as a signal instructing driver 112 to move lens 111 through a predetermined distance and the moving distance of lens 111. Focus assessment unit 15 identifies the current position of lens 111 from information on the number of pulses sent to driver 112 at the last activation of driver 112. Focus assessment unit 15 then calculates the difference between the current position and the in-focus position and refers to the table to determine the number of pulses corresponding to the difference. Focus assessment unit 15 sends the determined number of pulses to driver 112.

A second approach is as follows. In the minute movement mode, focus assessment unit 15 receives from driver 112 position signals indicating the positions of lens 111. Based on the position signals and the contrasts of captured images, focus assessment unit 15 generates a graph representing changes in contrast for the position signals. The graph is stored in memory (not shown) in controller 16. Focus assessment unit 15 refers to the graph to determine a position signal corresponding to the maximum contrast, and sends a control signal to driver 112 containing the position signal and an instruction to move lens 111.

Now, the mechanism of angle-of-view correction unit 13 shown in FIG. 1 will be described. When new pieces of image data from A/D converter 114 are stored in image memory 12, angle-of-view correction unit 13 takes any one of the image from among the plurality of image data as a reference and corrects the other images so that their angles of view match the angle of view of the one image. Angle-of-view correction unit 13 sends the one reference image and the other corrected images to display 14. The one image referenced in the angle-of-view correction will hereinafter be referred to as a base image. An exemplary method of image correction by angle-of-view correction unit 13 will be described in detail later.

The exemplary embodiment has been described for a case in which the CPU executes the program to implement angle-of-view correction unit 13 and focus assessment unit 15 as virtual units in the mobile terminal. Alternatively, each of angle-of-view correction unit 13 and focus assessment unit 15, or part of functions of these units, may be implemented with a dedicated integrated circuit such as a gate array.

Figure 3:
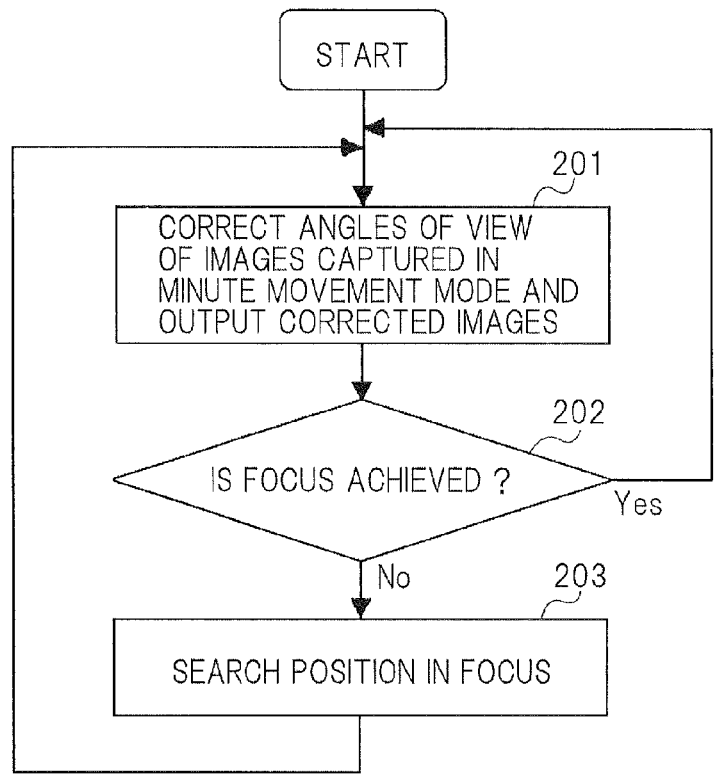
FIG. 3 is a flowchart showing the operation of the mobile terminal in the exemplary embodiment.

Now, the operation of the mobile terminal in the exemplary embodiment will be described. FIG. 3 is a flowchart showing the operation of the mobile terminal in the exemplary embodiment.

When the user directs camera unit 11 of the mobile terminal to a subject and operates the mobile terminal to input thereto an instruction to prepare for shooting, the mobile terminal activates camera unit 11. In order to determine whether the subject is in focus, the mobile terminal executes the minute movement mode, in which images are captured while lens 111 is moved back and forth in the optical axis direction. The mobile terminal corrects the angles of view of the images captured in the minute movement mode and outputs the corrected images to display 14 (step 201).

Figure 4A:
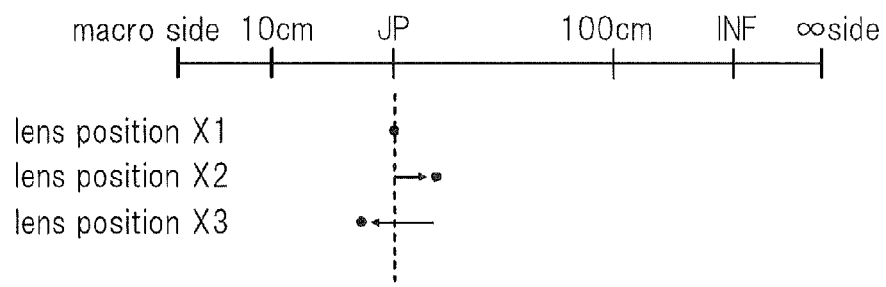
FIG. 4A is a diagram for describing the relationship between images obtained in a minute movement mode and lens positions at the times of capturing the images.
Figure 4B:
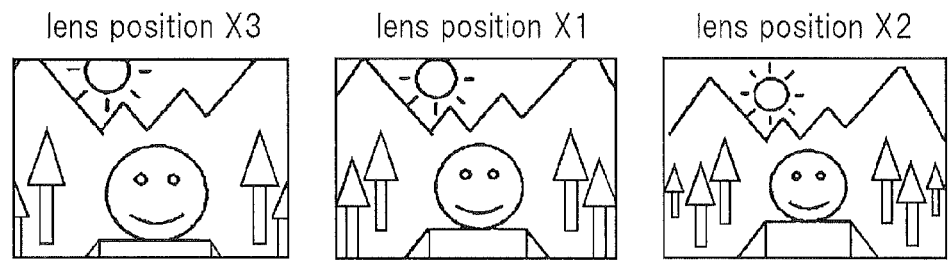
FIG. 4B is a diagram showing exemplary images obtained in the minute movement mode.

Here, a detailed example of images captured in the minute movement mode will be described. FIGS. 4A and 4B are diagrams for describing the relationship between images obtained in the minute movement mode and lens positions at the times of capturing. FIG. 4A is a graph showing the lens positions along the optical axis direction, while FIG. 4B shows the images captured with respective lens positions X1 to X3. In FIG. 4A, JP indicates the in-focus position.

Figure 5:
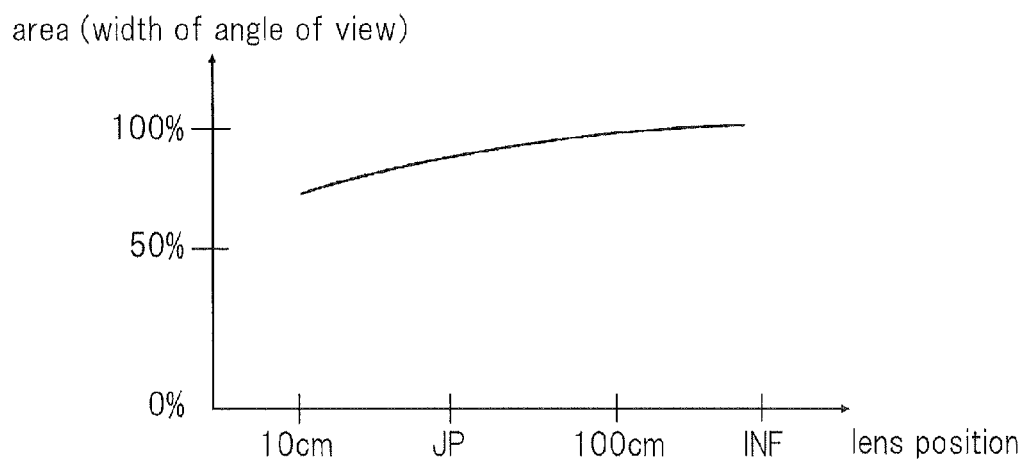
FIG. 5 is a diagram showing an exemplary graph illustrating the relationship between the angle of view and the lens position.

With reference to FIGS. 4A and 4B, the angle of view of the image captured with lens position X1 is narrower than the angle of view of the image captured with lens position X2, which is closer to the INF side relative to the in-focus position. Also, the angle of view of the image captured with lens position X1 is wider than the angle of view of the image captured with lens position X3, which is closer to the macro side relative to the in-focus position. In this manner, generally, the closer the lens position to the INF side or the infinity (∞) side than to the macro side, the wider the angle of view. FIG. 5 shows an exemplary graph illustrating the relationship between the angle of view and the lens position. In the graph shown in FIG. 5, the ordinate indicates the width of the angle of view while the abscissa indicates the lens position. It can be seen from FIG. 5 that the closer the lens position to the INF side, the wider the angle of view.

Figure 6:
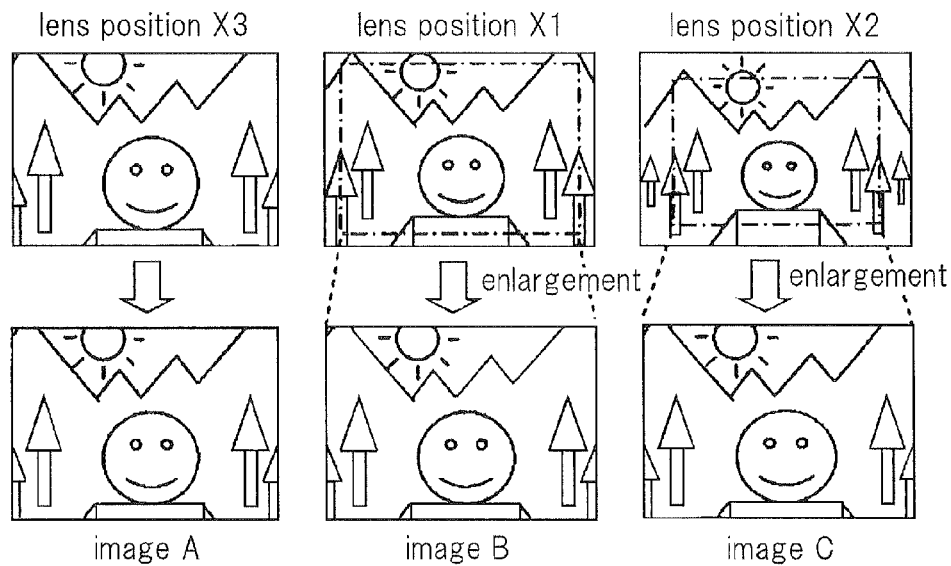
FIG. 6 is a diagram for describing a method of angle-of-view correction for the three images shown in FIG. 4B.
Figure 7:
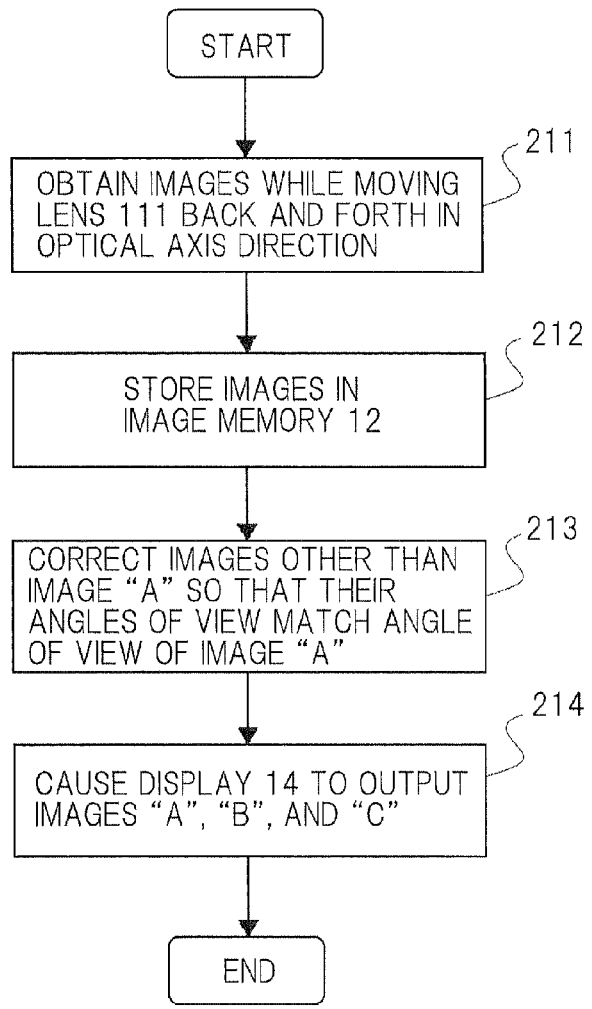
FIG. 7 is a flowchart showing a procedure of the method of angle-of-view correction in a process in step 201 shown in FIG. 3.

Description will be given below with reference to FIGS. 6 and 7, assuming that the three images shown in FIG. 4B are the images obtained by the mobile terminal in the minute movement mode. FIG. 6 is a diagram for describing a method of angle-of-view correction for the three images shown in FIG. 4B. FIG. 7 is a flowchart showing a procedure of the method of angle-of-view correction in the process in step 201 shown in FIG. 3.

The mobile terminal captures the subject while moving lens 111 back and forth in the optical axis direction in the minute movement mode, thereby obtaining three images with different angles of view (step 211). The mobile terminal stores the three images in image memory 12 (step 212) and designates, as the base image, an image with the narrowest angle of view among the three images. Accordingly, among the three images shown in FIG. 4B, the image captured with lens position X3 (image A shown in FIG. 6) is the base image.

Angle-of-view correction unit 13 in the mobile terminal corrects the other images so that their angles of view match the angle of view of image A (step 213). Specifically, angle-of-view correction unit 13 clips out an area matching the angle of view of image A from the image captured with lens position X1 and sets, as image B, the clipped-out area enlarged to the size of image A. In FIG. 6, an area surrounded by a dot-dash line is the clipped-out area. Angle-of-view correction unit 13 also clips out an area matching the angle of view of image A from the image captured with lens position X2 and sets, as image C, the clipped-out area enlarged to the size of image A.

Thus, the mobile terminal designates the image with the narrowest angle of view as the base image. This provides the following advantage: in the process in step 213 in which an area in each of the images captured with lens positions X1 and X2 is clipped out and aligned with the size of image A, the clipped-out area only needs to be enlarged to the size of image A.

After step 213, angle-of-view correction unit 13 sequentially sends images A, B, and C to display 14 to cause display 14 to sequentially output these images (step 214).

The image processing described with reference to FIGS. 3 and 7 is performed at every minute movement mode executed at regular time intervals in which lens 111 is moved back and forth in the optical axis direction. Since this allows any of images continuously displayed on display 14 to have the same angle of view, the subject never appears to vary in size, creating no discomfort for the user.

Next, in step 202 shown in FIG. 3, in order to determine whether or not focus is achieved, the mobile terminal refers to the three pieces of image data stored in image memory 12 to determine whether the amount of change in the contrast of the three images exceeds the threshold (step 202). If it is determined in step 202 that the amount of change in contrast exceeds the threshold, the mobile terminal determines that lens 111 is not at the in-focus position. The mobile terminal then determines, as a new in-focus position, a lens position at which the contrast is the maximum from the relationship between the image contrast and the lens position based on the contrasts of the three images, and executes the in-focus position search mode (step 203). After the process in step 203, the mobile terminal returns to step 201.

If it is determined in step 202 that the amount of change in the contrast does not exceed the threshold, the mobile terminal determines that lens 111 is at the in-focus position and returns to step 201.

The procedure described with reference to FIG. 7 assumes that image A is designated as the base image. Alternatively, the base image may be the image captured with lens position X1 shown in FIG. 4B. This is because, while AF-C executes the minute movement mode at regular time intervals, the position of lens 111 is likely to be at the in-focus position before the start of the next minute movement mode.

Thus, when the mobile terminal in the exemplary embodiment performs AF-C, the mobile terminal obtains images while moving the lens, extracts the differences of the images with respect to variations in angles of view of the images, and corrects the images so that their angles of view match each other. This allows restraining the variations in angle of view due to the minute movements of the lens. The mobile terminal therefore does not need to independently control each of the multiple lenses, thus meeting the demand for miniaturization of cameras for mobile devices such as mobile phones. Since variations in the angle of view of the images output on the display during AF-C are prevented, no discomfort is created for the user viewing the display.

In the angle-of-view matching to correct the images, an image on the macro-end side may be taken as the base image to process the other images so that their angles of view match the angle of view of the base image. In this manner, variations in the angle of view due to the lens movements from the macro end to the end may be corrected. The method of image processing in the exemplary embodiment is applicable not only to correcting variations in the angle of view due to the minute movements in AF-C, but also to preventing image wobbles that may occur in usual AF.

A technique similar to the method of image processing in the exemplary embodiment is a camera-shake correction technique for moving images. "Camera shake," which means that a user's hand holding a camera is not fixed but shaky, causes the problem of frame-by-frame misalignment of the angles of view of images of a subject captured while camera shake occurs. The camera-shake correction technique involves: setting the margin of a predetermined width along the periphery within each of all captured images; clipping out an area with the same angle of view excluding the margin from each of the continuous frames; and outputting or recording the clipped-out areas.

The camera-shake correction technique only clips out the same area from each frame and does not enlarge the images. Therefore, variations in the angle of view due to the lens movements in the optical axis direction cannot be corrected. As regards extracting the differences between pieces of image data, the method of image processing in the exemplary embodiment may be regarded as a method involving extraction of a distinct point, such as the method of detecting differences by the camera-shake correction technique. The exemplary embodiment, however, only enlarges or reduces the images by the amount of variations in the angle of view corresponding to the differences from the base image, and the distinct point is common among the frames. Therefore, the exemplary embodiment can be more easily implemented than the camera-shake correction technique.

The present invention is applicable to a mobile terminal with a camera including an image sensor and with an image processing function, such as a mobile phone, a PHS (Personal Handyphone System), or a PDA (Personal Digital Assistant). The program of the present invention may be recorded on a computer-readable recording medium.

In the above-described exemplary embodiment, focus assessment unit 15 is illustrated in the functional block diagram shown in FIG. 1 in order to detail the method of image processing in the exemplary embodiment. However, for the mobile terminal to perfoim the most essential feature part in the method of image processing in the exemplary embodiment, the mobile terminal may only need to include camera unit 11, image memory 12, angle-of-view correction unit 13, and display 14, among the components shown in FIG. 1.

An exemplary advantage of the present invention is the ability to prevent variations in the angle of view of images output on the display without requiring complicated lens control for the minute movements of the lens as in AF-C.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-268240 filed on Dec. 1, 2010, the content of which is incorporated by reference.

REFERENCE SIGNS LIST

11 camera unit
12 image memory
13 angle-of-view correction unit
14 display
15 focus assessment unit
16 controller
111 lens
112 driver
113 image sensor

The invention claimed is:

1. A mobile terminal comprising:
   a camera unit that executes a minute movement mode, in which a subject is captured while a lens is moved back and forth in an optical axis direction, and outputs a plurality of images with different angles of view;
   a storage unit that stores the plurality of images output from the camera unit;
   a controller that takes any one image of the plurality of images stored in the storage unit as a base image and corrects other images of the plurality of images so that the angles of view of the other images match the angle of view of the base image and determines whether the lens is at an in-focus position based on whether an amount of change in a contrast of the plurality of images stored in the storage unit exceeds a predetermined threshold; and
   a display outputting the base image and the other images corrected by the controller,
   wherein:
      when the amount of change in the contrast of the plurality of images exceeds the threshold, the controller determines, as a new in-focus position, a position of the lens at which a maximum image contrast is obtained based on contrasts of the plurality of images, and
      the controller takes an image, which corresponds to the new in-focus position of the lens, as a base image of a plurality of images which are obtained by a next minute movement mode.

2. The mobile terminal according to claim 1, wherein said next minute movement mode occurs at a time subsequent to said minute movement mode.

3. The mobile terminal according to claim 1, wherein said controller determines said new in-focus position prior to a start of said next minute movement mode.

4. The mobile terminal according to claim 1, wherein the lens is determined to be at an out-of-focus position when said amount of change in the contrast of the plurality of images exceeds the predetermined threshold.

5. The mobile terminal according to claim 1, wherein a value of the contrast of the plurality of images is determined based on a sum of differences between contrast values of adjacent pixels in a specified comparison area.

6. The mobile terminal according to claim 1, wherein said minute movement mode and said next minute movement mode are executed at a constant time interval.

7. A method of image processing for a controller in a mobile terminal, the mobile terminal comprising a camera unit with a lens, a storage unit, a display, and the controller, the method comprising:
   the controller causing the camera unit to execute a minute movement mode, in which a subject is captured while the lens is moved back and forth in an optical axis direction, and to output a plurality of images with different angles of view;
   the controller storing the plurality of images output from the camera unit in the storage unit;
   the controller taking any one image of the plurality of images stored in the storage unit as a base image and correcting the other images of the plurality of images so that the angles of view of the other images match the angle of view of the base image;

the controller causing the display to output the base image and the other images corrected; and the controller determining whether the lens is at an in-focus position based on whether an amount of change in a contrast of the plurality of images stored in the storage unit exceeds a predetermined threshold, wherein:

when it is determined that the amount of change in the contrast of the plurality of images exceeds the threshold, the controller determines, as a new in-focus position, a position of the lens at which a maximum image contrast is obtained based on the contrasts of the plurality of images, and the controller takes an image, which corresponds to the new in-focus position of the lens, as a base image of a plurality of images which are obtained by a next minute movement mode.

8. A non-transitory computer-readable recording medium having recorded therein a program to be executed by a controller in a mobile terminal, the mobile terminal comprising a camera unit with a lens, a storage unit, a display, and the controller, wherein the program causes the controller to perform a processing comprising:

causing the camera unit to execute a minute movement mode, in which a subject is captured while the lens is moved back and forth in an optical axis direction, and to output a plurality of images with different angles of view;

storing the plurality of images output from the camera unit in the storage unit;

taking any one image of the plurality of images stored in the storage unit as a base image and correcting the other images of the plurality of images so that the angles of view of the other images match the angle of view of the base image;

causing the display to output the base image and the other images corrected; and determining whether the lens is at an in-focus position based on whether an amount of change in a contrast of the plurality of images stored in the storage unit exceeds a predetermined threshold, wherein:

when it is determined that the amount of change in the contrast of the plurality of images exceeds the threshold, determining, as a new in-focus position, a position of the lens at which a maximum image contrast is obtained based on contrasts of the plurality of images, and taking an image, which corresponds to the new in-focus position of the lens, as a base image of a plurality of images which are obtained by a next minute movement mode.

* * * * *